Feb. 3, 1942.    R. S. CURLEY ET AL    2,271,793
COTTON PICKING MACHINE AND METHOD
Filed Jan. 21, 1939    3 Sheets—Sheet 2

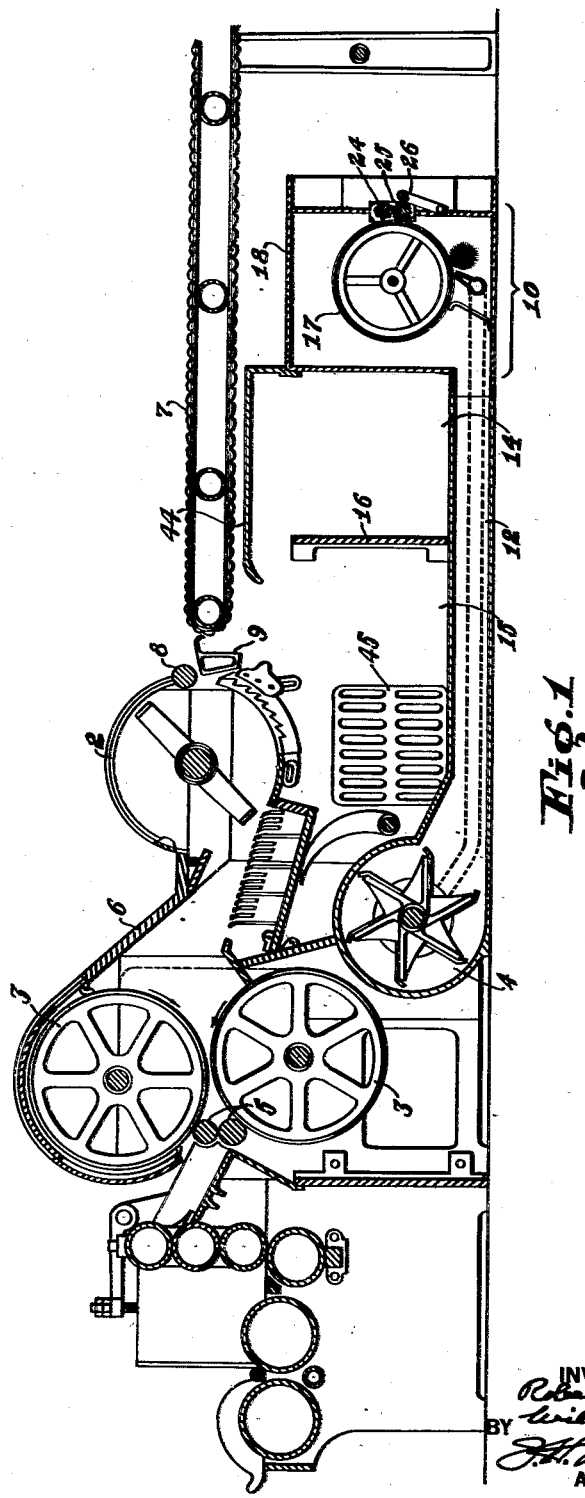

INVENTORS:
Robert S. Curley
and William Shaw
BY J. H. McCready
ATTORNEY.

Feb. 3, 1942. R. S. CURLEY ET AL 2,271,793
COTTON PICKING MACHINE AND METHOD
Filed Jan. 21, 1939 3 Sheets-Sheet 3
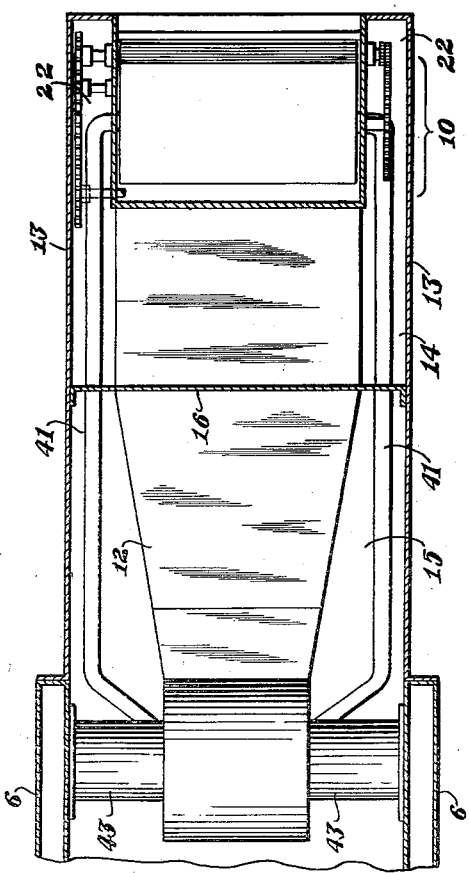
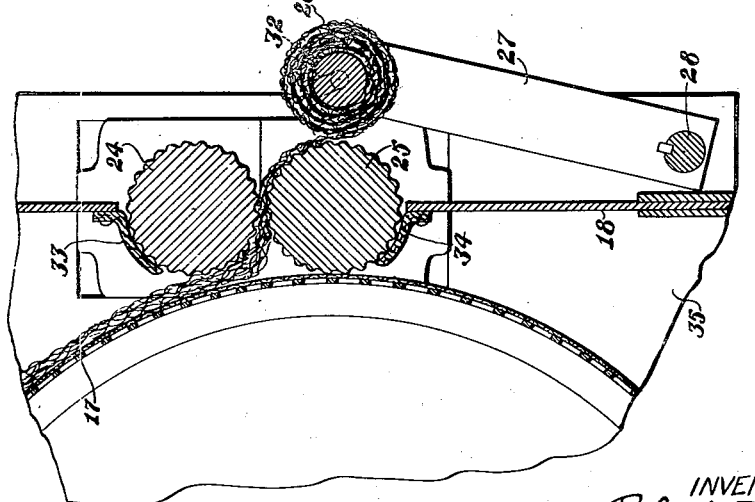
INVENTORS:
Robert S. Curley
William Shaw,
BY
ATTORNEY.

Patented Feb. 3, 1942

2,271,793

UNITED STATES PATENT OFFICE 2,271,793

COTTON PICKING MACHINE AND METHOD

Robert S. Curley, Biddeford, and William Shaw, Saco, Maine, assignors to Saco-Lowell Shops, Boston, Mass., a corporation of Maine Application January 21, 1939, Serial No. 252,156

11 Claims. (Cl. 19—89)

In United States Patent No. 2,057,369, granted in the name of one of the present applicants, a cotton picking system and a method of picking cotton have been disclosed which provide for the filtering of the relatively large volume of air required in the picking operation and the return of this air again to the picker room. This invention has contributed several important advantages to the picking operation. More especially it has made it feasible to humidify picker rooms, it has reduced the fire hazard, and it conserves the heat which formerly was wasted by the necessity for discharging the air stream outside the building.

The filter structure shown in the patent just referred to was designed more especially to handle a series of pickers. While this arrangement has proved very satisfactory and is being widely used commercially, it is frequently desirable to use an air filter individual to the picker with which it cooperates. Various attempts have been made heretofore to devise such an arrangement but none of them, so far as we have been able to learn, has proved satisfactory. Serious problems are introduced in devising such a solution by the fact that a typical condenser for a picker requires from about 1200 to 1500 cubic feet of air per minute for its operation, and the filtering of this body of air and removing the dust so completely that the air can again be returned to the picker room, is far from a simple matter. Moreover working conditions in the picker room are facilitated by recirculating the greater part of the air required in each picker within the machine structure, and this fact introduces difficulties in the formation of the sheet on the condenser cylinders which must be overcome in order to make such an installation practical.

The present invention is directed primarily to the solution of these problems and to the provision of a filter structure which will not only handle the large volume of air required and filter it so effectively that it can be returned to the picker room in a condition fit to be breathed, but which will also be substantially automatic in action and will require a minimum of care and attention on the part of the machine operator.

The nature of the invention will be readily understood from the following description when read in connection with the accompanying drawings, and the novel features will be particularly pointed out in the appended claims.

In the drawings,

Figure 1 is a longitudinal, vertical, sectional view of a picker equipped with a filter unit embodying features of this invention, the showing being somewhat diagrammatic in character;

Fig. 2 is a vertical, sectional view of the filter unit shown in Fig. 1;

Fig. 3 is a similar view of said unit approximately on the line 3—3, Fig. 2;

Fig. 4 is a vertical, sectional view through the delivery rolls and adjacent parts of the filter unit; and Fig. 5 is a plan view of portions of the arrangement shown in Fig. 1.

Referring first to Fig. 1, the construction there shown comprises a beater 2, condenser cylinders 3—3, a blower 4, and the delivery rolls 5 associated with the condenser to discharge the sheet from them, all of these parts being constructed, arranged and operated in any well known or suitable manner. As usual, the beater, condenser and blower are enclosed in a casing 6 which is equipped wtih ducts conducting air from the condenser screens or cylinders 3 to the intake ends of the blower, and also with suitable partitions for directing or guiding the flow of air through the dust chamber or mote chamber in the casing along the desired paths. So far as these features are concerned, no change need be made in the prior art constructions. Also, the cotton may be fed to the beater in any suitable manner, the particular arrangement shown including a feed lattice 7 of a common form which delivers a sheet produced by a previous unit to a point between the feed roll 8 and the evener pedal 9.

According to the present invention, a filter unit, indicated in general at 10, is installed under the feed lattice 7 and behind the mote chamber where it is connected with the blower 4 by a conduit 12. The filtered air is discharged from opposite ends of this unit against the side plates 13—13, Fig. 5, of the machine casing, and it returns through the chamber 14, Fig. 1, in which the weighting mechanism for the evener ordinarily is mounted, and through the mote chamber 15 where it is recirculated through the beater and condenser. During this return it is baffled somewhat by the girt 16, which extends entirely across the casing from one side thereof to the other.

As above indicated, the problem of devising a filter which will handle the large volume of air required for the condenser, while still effectively removing the dust from the air stream, has proved to be especially troublesome. We have found that this problem can be satisfactorily solved by screening the fibers out of the air stream and depositing them on a suitable screening surface, such as a rotary wire screen, and so controlling the rate of travel of the screen with reference to the rate of deposit of the fibers that a relatively thick layer of fiber will constantly be maintained across the air stream where it strains out the dust and other solid materials carried by said stream. In this way a very satisfactory filtering of the air stream is accomplished. In order to keep this filtering medium in effective condition, the fibrous layer is removed progressively from the screening surface, the screen area from which it is removed is then subjected to a cleaning action, and thereafter the fibrous layer is again formed on said cleaned surface. These steps are performed substantially continuously so that increments of the fibrous filter sheet are constantly being removed with their accumulation of dust and are promptly renewed, a filter sheet of approximately predetermined proportions being continuously maintained in filtering position.

An apparatus designed to operate in accordance with the method just described is best shown in Figs. 2 and 3. It comprises a rotary screening drum 17 mounted in the filter housing or casing 18. This drum may conveniently consist of a cylinder of expanded or reticulated metal, supported on suitable spiders, which, in turn, are carried by the shaft 20. A wire screen of fine mesh is supported on the cylinder and forms the surface which performs the initial screening operation. Air discharged from the blower 4 is led into the intake 21, Fig. 2, of the casing 18 and is guided by it through the peripheral surface of the drum 17 and thence axially out through the ends of this drum into chambers 22—22 formed between the outer lateral walls of the casing 6 and the partitions 23—23, Fig. 3, which form the opposite ends of the filter chamber. Any suitable arrangement may be employed for sealing the ends of the drum to prevent undue leakage around it.

As the fiber which escapes through the condenser screens is deposited on the screening surface of the drum, it builds up a layer in the manner above described, the thickness of which can be predetermined by controlling the rate of revolution of the drum. In a cotton picker we have found it desirable to rotate this cylinder only very slowly, say, for example, one revolution in two hours or more, so that a coherent layer of loosely associated cotton fibers will be built up on the surface of the screen, and allowed to attain a maximum thickness of perhaps three-quarters of an inch, or more, before being removed.

The removal of the fibrous filter sheet preferably is accomplished by means of upper and lower delivery rolls 24 and 25, Fig. 4, mounted at one side of the drum. Both rolls may be of fluted metal construction and the lower roll should run very close to the screening surface with just a good operating clearance. The upper roll, however, should have considerably greater clearance. They remove the filter sheet from the screen, feeding it between them, as clearly shown in Fig. 5. In this action the rolls are assisted somewhat by the tendency of the air to flow outwardly through the screen below the point at which the upper roll 24 presses the filter layer against the surface of the drum.

The filter layer so discharged is wound up into the form of a lap on a scavenger roll 26, covered with clearer cloth and bearing against the outer surface of the lower delivery roll 25. The roll 26 is removably supported in two arms 27—27, both secured on a rock shaft 28, and a coiled spring 30 acts through an arm 31 and said arms 27 to hold the roll 26 constantly but yieldingly against the roll 25. The necessary rotary movement of the former to enable it to wind up the lap is produced by this contact. At suitable intervals a full roll 26 is removed and replaced by an empty one, stub shafts projecting from the ends of the roll fitting loosely into slots in the arms 27 to facilitate such removal and replacement. One of these slots is shown in Fig. 4 at 32.

Since the delivery rolls 24 and 25 carry the fibrous filter layer out of the air stream and discharge it from the filter housing, some means should be provided to prevent leakage of the unfiltered air around the rolls, and this may easily be accomplished by mounting flexible sealing strips 33 and 34, respectively, of leather or the like, on the casing where they will lie against the adjacent inner surfaces of the respective rolls.

As successive portions of the screen pass the delivery rolls, they move into a space 35 from which the unfiltered air is substantially excluded, partly by the delivery rolls and their contact with the filter sheet and partly, also, by an inclined partition strip 36, Fig. 2, extending across the filter chamber from one end thereof to the other and provided with a flexible tip bearing against the peripheral surface of the drum 17. This non-filtering space is provided chiefly for the purpose of affording an opportunity for cleaning the surface of the screen. While various forms of cleaning apparatus may be used, we prefer to use both a brush for mechanically loosening the residual fiber from the screen, and also a vacuum, or other air handling apparatus, for carrying the loosened dust and fiber away. The brush is shown at 37, mounted on a shaft 38, and it preferably is equipped with a wire clothing similar to that used on the stripping roll of a card. The wires of such a clothing are very flexible and this fact makes it feasible to locate the brush so that the tips of the wires run in contact with the screen where they are very effective in dislodging fiber tending to adhere firmly to it. Preferably the brush is revolved in the same direction as the adjacent surface of the screen on which it operates, but it is driven at a higher surface speed than the latter.

Immediately after leaving the brush the screening surface moves across the open slot of a vacuum nozzle 40 which extends across the entire screening surface of the drum. Ducts or conduits 41—41, Figs. 2, 3 and 5, connect the opposite ends of the trunk or body 42 from which the nozzle 40 projects with the intake conduits 43—43, Fig. 5, of the blower 4. Consequently, the blower draws air through the nozzle 40 and delivers it again into the air stream flowing to the filter. Because the air pressure inside the drum is above that of the surrounding atmosphere and a suction is maintained at the mouth of the nozzle 40, air is drawn from the inside of the screen through the screening surface in the reverse direction to that maintained through the screen during the filtering operation, and dust and lint adhering to the screen, as well as that loosened by the brush, are drawn into the vacuum clearer and discharged through the blower, as just described.

When, therefore, the surface of the screen so acted upon passes the partition 36 and is again brought into the filtering position, it has been restored substantially to its original clean condition. The incoming stream of air to be filtered immediately begins to deposit fiber on this surface and thus renews or rebuilds the portion of the filter layer previously removed. Were it not for the cleaning action, however, the meshes of the screen ultimately would become plugged with lint and the air handling capacity of the filter would drop to such a value that the operation of the machine would be seriously interfered with. In fact, it would be necessary after a time to shut down the machine and make a business of cleaning the filter. The cleaning mechanism, however, operates automatically, without attention, and it is particularly valuable when the cotton is treated with oil in the opening room, which is now a common practice. The oily lint which passes through the mesh of the calender screens and lodges on the screening surface of the drum 17, tends to adhere strongly to said surface. It is effectually removed, however, by the brush 37 and is carried away by the vacuum apparatus.

As above stated, the filtered air flows through the ends of the drum 17 and into the chambers 22—22 from which it flows forwardly through the chamber 14, over the girt 16, and into the mote chamber 15. It is necessary for the proper operation of the picker and the production of a satisfactory sheet, to reduce the velocity of this air before it enters the mote box. This is accomplished by so mounting the filter unit that the girt 16 can be utilized as a baffle and providing a chamber 14 through which the air discharged from the filter flows. Here the eddy currents tend to die out, the air velocity is slowed down, and the air flows from this chamber at a relatively slow rate and comparatively smoothly over the top of the girt 16 and into the mote chamber 15 where the rate of flow becomes still slower. By properly proportioning these parts the flow over the girt may be readily reduced to less than three hundred feet per minute. Such a rate does not interfere materially with the separation of the motes from the air stream. Any interference of the air currents with the feeding of the cotton to the beater is prevented by the presence of a top plate 44 extending from one side of the casing to the other and across the chamber 14, and by a similar arrangement of the top plate of the filter casing 18.

Additional control of the air discharged from the filter is necessary because of the fact that the volume of air delivered by the blower 4 through the filter exceeds that drawn by the fan from the mote box. Consequently, if the mote box were a closed chamber, and all the air discharged by the filter were directed into it, an excessive pressure would be built up which would be detrimental to the cleaning of the cotton on the grid bars and the sheeting of the cotton on the condenser screens 3—3. This control of the sheeting operation is very important because of the desirability of delivering a sheet having as little yard for yard variation as possible.

In order to deal with this problem, open grates or doors 45 are provided at the opposite sides of the mote chamber where they afford free escape for any excess in the volume of air. Thus the pressure of the air in the mote box automatically adjusts itself to, or balances itself with, the pressure of the surrounding atmosphere outside the picker. By this arrangement it has been found possible to reduce the air velocity in the mote chamber to the very low value desirable and to so change the direction of the air currents, that the quantity of dirt and foreign materials beaten through the grid bars and collecting in the bottom of the mote box can be materially increased as compared to the conventional arrangement. This is an important advantage, both from the standpoint of proper cleaning of the cotton and also of the distribution of the cotton on the calender screens.

The arrangement above described has been found in practice to produce very satisfactory results. It affords an effective filtering of the air so that the latter is in proper condition both for re-use in picking and also for discharge into the picker room. In addition, it has the advantages of facilitating humidification, controlling fire, and conserving heat, which have been important factors in the use of the system disclosed in the patent above referred to. Preferably the filter structure is made in a self-contained unit, as shown in Figs. 2 and 3, so that it may readily be installed on machines in regular production. In addition, the unit also finds application to other machines than pickers such, for example, as openers and nappers.

In using this arrangement we have found that the effectiveness of the filter depends largely upon the thickness of the fiber mat or layer maintained on the screen, as would be expected, but that it also varies greatly with the air speed. Our experience indicates that about five hundred feet per minute is as high an air speed as should be used. Above that figure the quantity of dust carried through the filter sheet becomes excessive and better results are produced with lower air velocities.

Recirculation of the air within the picker is of advantage in making the picker a self-contained unit and also in confining the greater part of the air stream to a fixed path inside the machine even when an interchange of air in the mote chamber with the surrounding atmosphere is permitted, so that better working conditions are produced than would be obtained if the entire air stream were discharged from the filter directly into the picker room.

The various moving elements of the filter may conveniently be driven from a single shaft 46, Figs. 2 and 3, which, in turn, may be driven from any suitable element of the picker. A satisfactory method of driving this shaft is by means of a pawl and ratchet mechanism operated by a cam or eccentric on the shaft of one of the condenser screens 3—3. Preferably the upper delivery roll 24 and the shaft 38 for the wire brush 37 are equipped with sprocket wheels 47 and 48 and they are driven by a chain 49 operated by a sprocket wheel 50 on the shaft 46. These connections are all at the right-hand side, Fig. 3, of the machine. At the opposite side the delivery roll 25 is geared to its companion roll 24, and a pinion 51 on the shaft of the latter roll drives a gear 52 on the shaft 20 of the drum 17.

This application is a continuation, in part, of our pending application Ser. No. 121,996, filed Jan. 23, 1937 (since issued as Patent No. 2,206,297, dated July 2, 1940).

In a divisional application Ser. No. 313,842, filed Jan. 15, 1940, we have claimed the air filtering apparatus and air filtering method disclosed in the instant application, the claims of the present case being confined to improvements in cotton picking methods and machines.

While we have herein shown and described a preferred embodiment of our invention, it will be evident that the invention is susceptible of embodiment in other forms without departing from the spirit or scope thereof.

Having thus described our invention, what we desire to claim as new is:

1. That improvement in methods of picking cotton which consists in beating the cotton, conveying the cotton in a stream of air away from the beating point, condensing the cotton out of said air stream, recirculating the air so utilized through the beating and condensing zones, filtering the air stream during its return from the condensing zone to the beating area, and reducing the velocity of the filtered air before delivering it to the beating zone to a value of not over five hundred feet per minute so that the motes beaten out of the cotton can fall freely through the air stream.

2. That improvement in methods of picking cotton which consists in beating the cotton, conveying the cotton in a stream of air away from the beating point, condensing the cotton out of said air stream, recirculating the air so utilized through the beating and condensing zones, filtering the air stream during its return from the condensing zone to the beating area, guiding the filtered air through a chamber in which its velocity is reduced and eddy currents are minimized, then flowing it smoothly and relatively slowly into the beating zone and reducing the velocity of the filtered air immediately before it is so delivered to the beating zone to a value of not over five hundred feet per minute, so that the motes beaten out of the cotton can fall freely through the portion of the air stream in which the velocity is so reduced.

3. In a cotton picker, the combination with a beater, a condenser, a blower and a casing enclosing said beater and condenser, of means cooperating with said elements to provide an air circulating system within the machine through which said blower maintains a stream of air continuously flowing through said beater and condenser and recirculates said air in a substantially closed circuit, said means including a filter through which said current of air is conducted during its return from said condenser to said beater, said filter comprising a movable air filtering medium, mechanism for feeding said medium through the air stream, and means cooperating with said filter to maintain said air filtering medium in an efficient condition including means for cleaning said filtering medium thoroughly and progressively as the filtering operation proceeds.

4. In a cotton picker, the combination with a beater, a condenser, a blower and a casing enclosing said beater and condenser, of means cooperating with said elements to provide an air circulating system within the machine through which said blower maintains a stream of air continuously flowing through said beater and condenser and recirculates said air in a substantially closed circuit, said means including a filter through which said current of air is conducted in its return from said condenser to said beater, said filter comprising a screening drum, mechanism for revolving said drum at such a speed that the fiber screened thereby out of the air stream will be deposited upon the screening surface of the drum in a relatively thick layer which serves to filter the air stream, and means for progressively removing said fiber layer from said screening surface.

5. In a cotton picker, the combination with a beater, a condenser, a blower and a casing enclosing said beater and condenser, of means cooperating with said elements to provide an air circulating system within the machine through which said blower maintains a stream of air continuously flowing through said beater and condenser and recirculates said air in a substantially closed circuit, said means including a filter through which said current of air is conducted in its return from said condenser to said beater, said filter comprising a screening drum, mechanism for revolving said drum, and means for automatically and progressively removing the material strained out of the air stream and accumulated on the screening surface of said drum.

6. In a cotton picker, the combination with a beater, a condenser, a blower and a casing enclosing said beater and condenser, of means cooperating with said elements to provide an air circulating system within the machine through which said blower maintains a stream of air continuously flowing through said beater and condenser and recirculates said air in a substantially closed circuit, said means including a filter through which said current of air is conducted in its return from said condenser to said beater, said filter comprising a screening drum, mechanism for revolving said drum, means for automatically and progressively removing the material strained out of the air stream and accumulated on the screening surface of said drum, and additional means for automatically cleaning the surface of said screen from which said material has been removed.

7. In a cotton picker, the combination with a beater, a condenser, a blower and a casing enclosing said beater and condenser, of means cooperating with said elements to provide an air circulating system within the machine through which said blower maintains a stream of air continuously flowing through said beater and condenser and recirculates said air in a substantially closed circuit, said means including a filter through which said current of air is conducted during its return from said condenser to said beater, said filter comprising a screening drum, mechanism for revolving said drum, means for automatically and progressively removing the material strained out of the air stream and accumulated on the screening surface of said drum, said system also including a chamber through which the filtered air is conducted on its way to the mote chamber under said beater and in which chamber the velocity of said air is materially reduced.

8. In a cotton picker, the combination with a beater, a condenser, a blower and a casing enclosing said beater and condenser, of means cooperating with said elements to provide an air circulating system within the machine through which said blower maintains a stream of air continuously flowing through said beater and condenser and recirculates said air in a substantially closed circuit, said means including a filter through which said current of air is conducted during its return from said condenser to said beater, said filter comprising a screening drum, mechanism for revolving said drum, means for automatically and progressively removing the material strained out of the air stream and accumulated on the screening surface of said drum, said system also including parts for guiding the filtered air into the mote chamber under said beater, said mote chamber being open to the surrounding atmosphere.

9. A cotton picker according to preceding claim 4, in combination with a rotary brush positioned and arranged to sweep the surface of said screen from which said layer of fiber has been removed.

10. A cotton picker according to preceding claim 4, in combination with means utilizing a localized current of air to clean the surface of said screen from which said layer has been removed.

11. A cotton picker according to preceding claim 4, in combination with a vacuum cleaning apparatus arranged to act on the surface of said screen from which said layer has been removed.

ROBERT S. CURLEY.
WILLIAM SHAW.